(12) United States Patent
Yang et al.

(10) Patent No.: US 8,533,173 B2
(45) Date of Patent: Sep. 10, 2013

(54) GENERATING SEARCH QUERY SUGGESTIONS

(75) Inventors: Qingxuan Yang, Beijing (CN); Tian Tian, Beijing (CN); Jesse Shieh, Alpharetta, GA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/388,026

(22) PCT Filed: Aug. 4, 2009

(86) PCT No.: PCT/CN2009/000872
§ 371 (c)(1),
(2), (4) Date: Jan. 30, 2012

(87) PCT Pub. No.: WO2011/014978
PCT Pub. Date: Feb. 10, 2011

(65) Prior Publication Data
US 2012/0131035 A1    May 24, 2012

(51) Int. Cl.
*G06F 17/30* (2006.01)
(52) U.S. Cl.
USPC .......................................................... 707/706
(58) Field of Classification Search
USPC ........................ 707/3, 7, 104.1, 706; 715/730
See application file for complete search history.

(56) References Cited

U.S. PATENT DOCUMENTS

| | | | |
|---|---|---|---|
| 2007/0192319 A1* | 8/2007 | Finley et al. | 707/7 |
| 2008/0028313 A1* | 1/2008 | Ebert | 715/730 |
| 2008/0059428 A1* | 3/2008 | Kinder | 707/3 |
| 2009/0187515 A1 | 7/2009 | Andrew et al. | |
| 2009/0187540 A1 | 7/2009 | Richardson et al. | |
| 2009/0210448 A1* | 8/2009 | Carlson | 707/104.1 |

FOREIGN PATENT DOCUMENTS

| | | |
|---|---|---|
| CN | 1809804 A | 7/2006 |
| CN | 1940925 A1 | 4/2007 |
| CN | 101073080 A | 11/2007 |
| CN | 101194256 A | 6/2008 |

OTHER PUBLICATIONS

International Preliminary Report on Patentability from International Application No. PCT/CN2009/000872, mailed Feb. 16, 2012, 6 pgs.
International Search Report from International Application No. PCT/CN2009/000872 mailed May 6, 2010, 10 pgs.

* cited by examiner

*Primary Examiner* — Etienne Leroux
(74) *Attorney, Agent, or Firm* — Fish & Richardson P.C.

(57) ABSTRACT

Methods, systems, and apparatus, including computer program products, for generating search query suggestions are provided. In one aspect, a method includes receiving in a data processing device a first textual input entered in a search engine query input field by a user; automatically sending from the device, before the user submits a request for a search and after waiting a predetermined amount of time after receiving each token of the first textual input, the first textual input to a first search service and a second search service; receiving from the first search service a set of first input suggestions and from the second search service a set of second input suggestions that is different from the set of first input suggestions; and displaying the first input suggestions in a first portion of a user interface and the second input suggestions in a distinct second portion of the user interface.

20 Claims, 5 Drawing Sheets

GENERATING SEARCH QUERY SUGGESTIONS

BACKGROUND

This specification relates to digital data processing, and in particular, to computer-implemented search services.

Conventional search services provide search query suggestions as alternatives to input search queries. For example, a conventional search engine can include a query input field that receives an input search query. In response to receiving the input search query, a conventional search service can provide search query suggestions for the input search query. A user can select a search query suggestion for use as a search query.

Conventional search services provide search query suggestions that are particular to the search service that generated the search query suggestions. Some conventional search services provide query suggestions that are specifically directed to searching a particular type of resource, e.g., images, videos, web pages. In addition, some search services provide alternatives to the input query that identify Internet addresses, e.g., Uniform Resource Locators (URLs), of suggested resources that are relevant to the input query. Different search services generally provide different input suggestions.

SUMMARY

This specification describes technologies relating to generation of search query suggestions.

In general, one aspect of the subject matter described in this specification can be embodied in methods that include the actions of receiving in a data processing device a first textual input entered in a search engine query input field by a user; automatically sending from the device, before the user submits a request for a search and after waiting a predetermined amount of time after receiving each token of the first textual input, the first textual input to a first search service and a second search service; receiving from the first search service a set of first input suggestions, each first input suggestion being textually different from the first textual input and selectable as an alternative to the first textual input; receiving from the second search service a set of second input suggestions that is different from the set of first input suggestions, each second input suggestion being textually different from the first textual input and selectable as an alternative to the first textual input; and displaying the first input suggestions in a first portion of a user interface and the second input suggestions in a second portion of the user interface, where the first portion is distinct from the second portion. Other embodiments of this aspect include corresponding systems, apparatus, and computer program products.

These and other embodiments can optionally include one or more of the following features. The method further includes receiving a user selection of a first input suggestion; and sending the selection to the first search service and not the second search service. The method further includes storing the first input suggestions and the second input suggestions in a local cache memory; receiving a second textual input entered in a search engine query input field by the user after receiving the first textual input and after the first input suggestions and the second input suggestions are stored in the local cache memory; comparing the second textual input to the first textual input and determining that the first textual input is the same as the second textual input; and displaying the first input suggestions and the second input suggestions stored in the local cache memory.

The first input suggestions are query expansions that represent alternative queries. The second input suggestions identify Internet addresses of suggested resources. The device is an intermediate server. The device is a client computer directly controlled by the user. Displaying the first input suggestions and the second input suggestions includes displaying the first input suggestions in the first portion and the second input suggestions in the second portion of a same interface element in the user interface. The same interface element is a drop-down menu. The method further includes rendering the first portion using a first color and the second portion using a distinct second color. The method further includes receiving user preferences specifying the first search service and the second search service.

Particular embodiments of the subject matter described in this specification can be implemented to realize one or more of the following advantages. Automatically obtaining and displaying first input suggestions from a first search service and second input suggestions from a second search service reduces how much user interaction is required to obtain search suggestions from multiple search services and perform searches using a selected search suggestion for a particular search service. In addition, automatically obtaining and displaying first input suggestions from a first search service and second input suggestions from a second search service can increase the coverage of searches by capturing search query suggestions for multiple search services that can be directed to searches for different types of resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
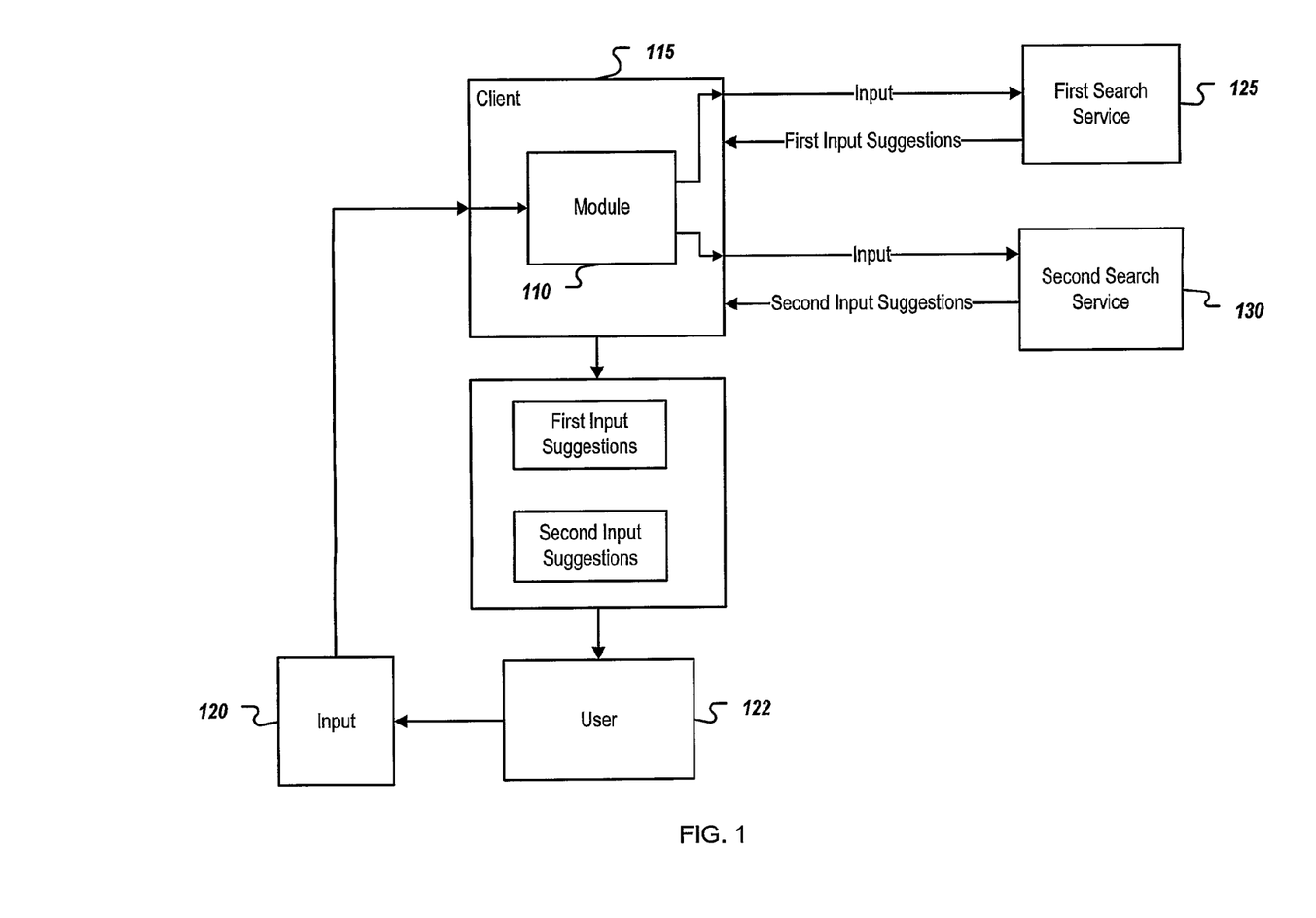
FIG. 1 is a block diagram illustrating an example of a flow of data in some implementations of a system that generates input suggestions using multiple search services.

FIG. 1 is a block diagram illustrating an example of a flow of data in some implementations of a system that generates input suggestions using multiple search services. A module 110, e.g., a JavaScript script, installed on a client 115 monitors input 120 received in a search engine query input field from a user 122. In some implementations, the module 110 is plug-in software that is installed in a web browser running on the client 115. In some alternative implementations, the module 110 is installed on an intermediate server that receives the input 120.

The module 110 receives the input 120 and automatically sends the input 120 to multiple search services, e.g., a first search service 125 and a distinct second search service 130, as the input 120 is received. Each search service returns one or more input suggestions for searches to be performed by the particular search service. The first search service 125 generally will return a set of input suggestions that is different from a set of input suggestions returned by the second search service. In some implementations, the user 122 can specify the multiple search services by setting user preferences.

The module 110 receives first input suggestions from the first search service 125 and second input suggestions from the second search service 130. The input suggestions are alternatives to the input 120, e.g., expansions, completions, transliterations. The first input suggestions and the second input suggestions are all distinct from the input 120.

The module 110 can present the first input suggestions and second input suggestions to the user 122 in real time, i.e., as the user 122 is typing characters in the search engine query input field. For example, the module 110 can present a first collection of first input suggestions and second input suggestions associated with a first character typed by the user 122, and present a second collection of first input suggestions and second input suggestions associated with a sequence of the first character and a second character in response to the user 122 typing the second character in the sequence.

Figure 2:
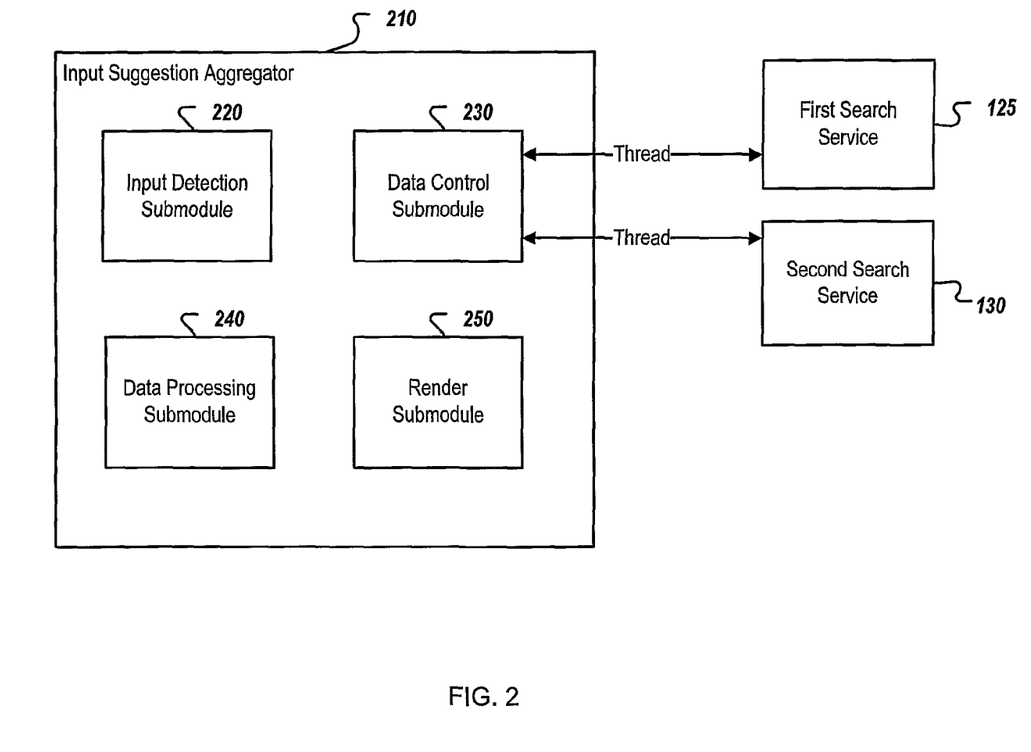
FIG. 2 is a block diagram illustrating an example input suggestion aggregator.

FIG. 2 is a block diagram illustrating an example input suggestion aggregator 210. The input suggestion aggregator 210 includes an input detection submodule 220, a data control submodule 230, a data processing submodule 240, and a render submodule 250. The input detection submodule 220 detects input entered in a search engine query input field.

The data control submodule 230 communicates with two or more search services. In some implementations, the data control submodule 230 creates a thread for each of the two or more search services. In some implementations, the data control submodule 230 includes an event handler, e.g., an Ajax handler. The event handler generates calls to a communication engine, e.g., an Ajax engine, that sends asynchronous requests, e.g., XMLHttp requests, for input suggestions to the two or more search services. In some implementations, the data control submodule 230 generates a call to the communication engine immediately after each token of a textual input, e.g., after each character of a first search query or each word of a first search query, is received at the search engine query input field. As a result, input suggestions can be provided to the user as the user types each token of the textual input. In some alternative implementations, the data control submodule 230 implements a delay, waiting a predetermined amount of time before automatically making the request to the two or more search services. The predetermined amount of time is specified in the module 110. The predetermined amount of time can be any amount of time, e.g., 0 ms, 150 ms, greater than or equal to 0. In practice, the predetermined amount of time typically falls in a range between 0 ms and 500 ms. In some implementations, the user 122 can specify the predetermined amount of time by setting user preferences.

The data control submodule 230 receives different input suggestions from the two or more search services and sends the input suggestions to the data processing submodule 240. The data processing submodule 240 stores the input suggestions in a computer-readable memory, e.g., a local cache memory implemented in a local random access memory. In some implementations, the data processing submodule 240 stores the textual input in the computer-readable memory and associates the input suggestions with the textual input. When another textual input, e.g., a second search query, is received, the data processing submodule 240 can compare the other textual input to textual inputs associated with input suggestions stored in the computer-readable memory. If the other textual input is the same as a stored textual input, then the data processing submodule 240 provides the input suggestions associated with the stored textual input to the render submodule 250 for rendering without requesting input suggestions from the search services.

The render submodule 250, e.g., an Ajax render engine, renders the input suggestions for display to the user as the input suggestions are received from the search services. In some implementations, the render submodule 250 renders input suggestions for each search service for display in distinct portions of a user interface.

Figure 3A:
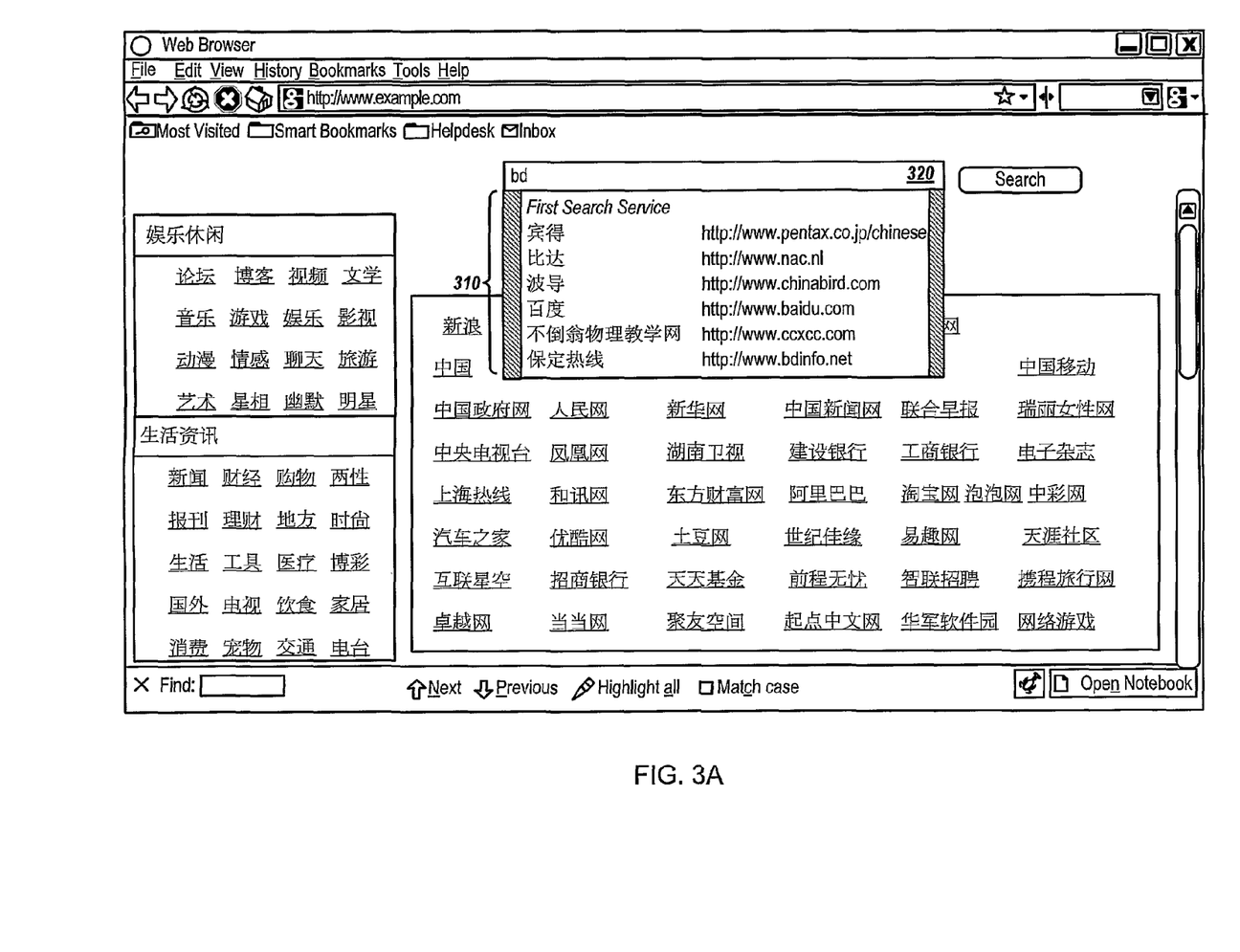
FIG. 3A is a screenshot illustrating an example of a web page presenting a group of first input suggestions generated using a first search service.

FIG. 3A is a screenshot illustrating an example of a web page presenting a group 310 of first input suggestions generated using a first search service. The web page includes a search query input field 320. The search query input field 320 includes a search query "bd". First input suggestions were requested from the first search service by the input suggestion aggregator 210.

The input suggestion aggregator 210 receives first input suggestions and displays the first input suggestions in an interface element of the web browser showing the web page. In the example of FIG. 3A, the interface element is a drop-down menu showing first input suggestions that are transliterations of expansions of "bd", e.g., " 宾得 " ("Bīn dé" in Romanized Chinese), " 百度 " ("Bǎi dù" in Romanized Chinese). When a user selects one of the first input suggestions, the input suggestion aggregator 210 sends the selection to the first search service, and the first search service responds in accordance with the selection.

In some implementations, the first input suggestions identify Internet addresses of suggested resources, e.g., relevant web pages. When a user selects one of the first input suggestions, the input suggestion aggregator 210 sends the selection to the first search service, and the first search service redirects a web browser instance to the Internet address of the suggested resource identified by the selected first input suggestion.

Figure 3B:
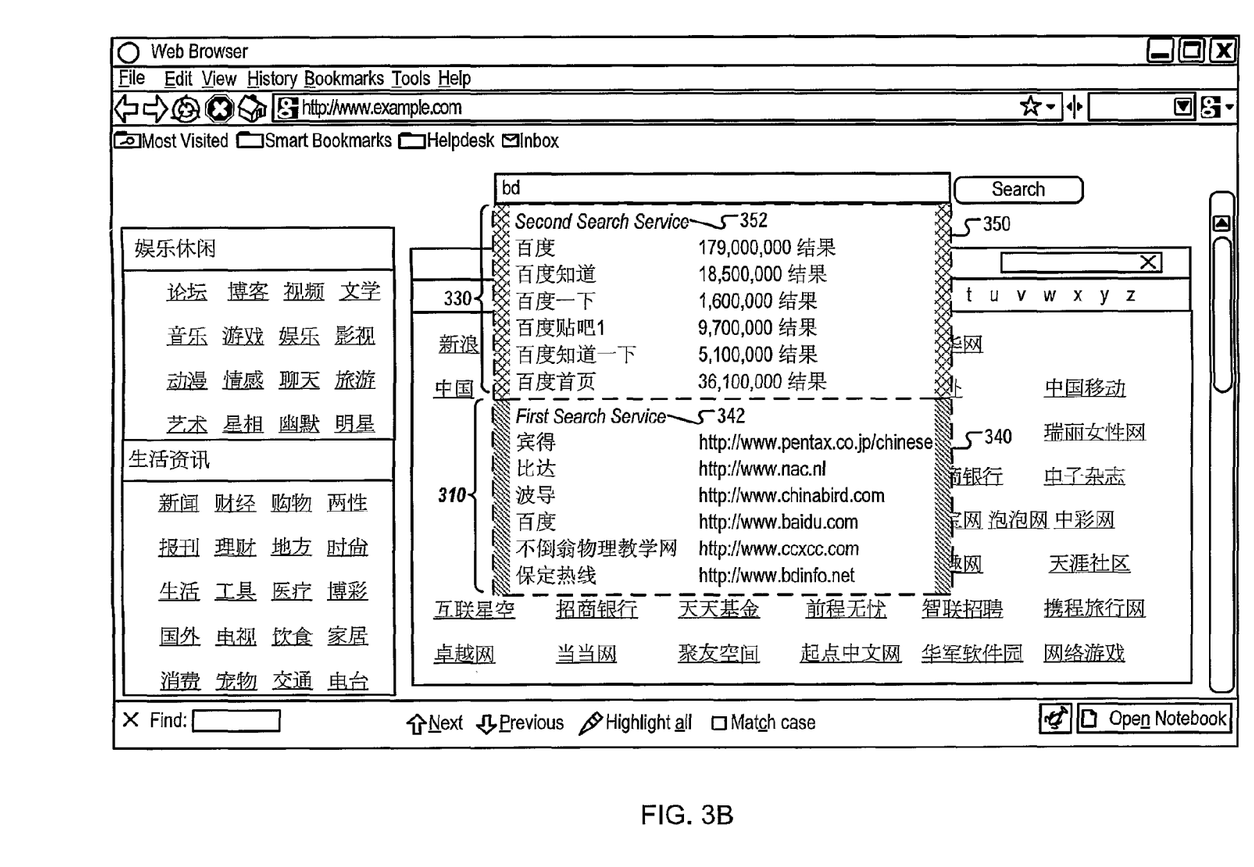
FIG. 3B is a screenshot illustrating an example of the web page presenting the group of first input suggestions and a group of second input suggestions generated using a second search service.

FIG. 3B is a screenshot illustrating an example of the web page presenting the group 310 of first input suggestions and a group 330 of second input suggestions generated using a second search service. In the example of FIG. 3B, the input suggestion aggregator 210 is configured to request first input suggestions from the first search service and second input suggestions from the second search service before the user submits a request for a search, e.g., by pressing an "Enter" key or selecting a "Search" button on the web page. In the example, the second input suggestions are transliterations of expansions of "bd", e.g., " 百 度 " ("Bǎi dù" in Romanized Chinese), " 百度知道 " ("Bǎi dù zhī dao" in Romanized Chinese). The input suggestion aggregator 210 displays the first input suggestions and the second input suggestions in distinct portions, e.g., a first portion 340 and a second portion 350, of a same interface element, e.g., a drop-down menu. Because the first input suggestions and second input suggestions are displayed in distinct portions, a user can easily distinguish between an input suggestion associated with the first search service and one associated with the second search service. In some implementations, a user can easily determine whether an input suggestion is associated with the first search service or the second search service because the first portion 340 has an indicator 342 identifying the first search service, e.g., a "First Search Service" label, and the second portion 350 has an indicator 352 identifying the second search service, e.g., a "Second Search Service" label.

In some implementations, render submodule 250 further or alternatively distinguishes the groups of first input suggestions and second input suggestions by rendering the first portion 340 and second portion 350 with distinct visual features. For example, in FIG. 3B, the first portion 340 is rendered using a first color, e.g., as represented by boundaries with a first pattern, and the second portion 350 is rendered using a distinct second color, e.g., as represented by boundaries with a second pattern.

In the example of FIG. 3B, when a user selects one of the second input suggestions, the input suggestion aggregator 210 sends the selection to the second search service, and a web browser instance is redirected to a web page displaying search results generated by the second search service for the selected second input suggestion.

Figure 4:
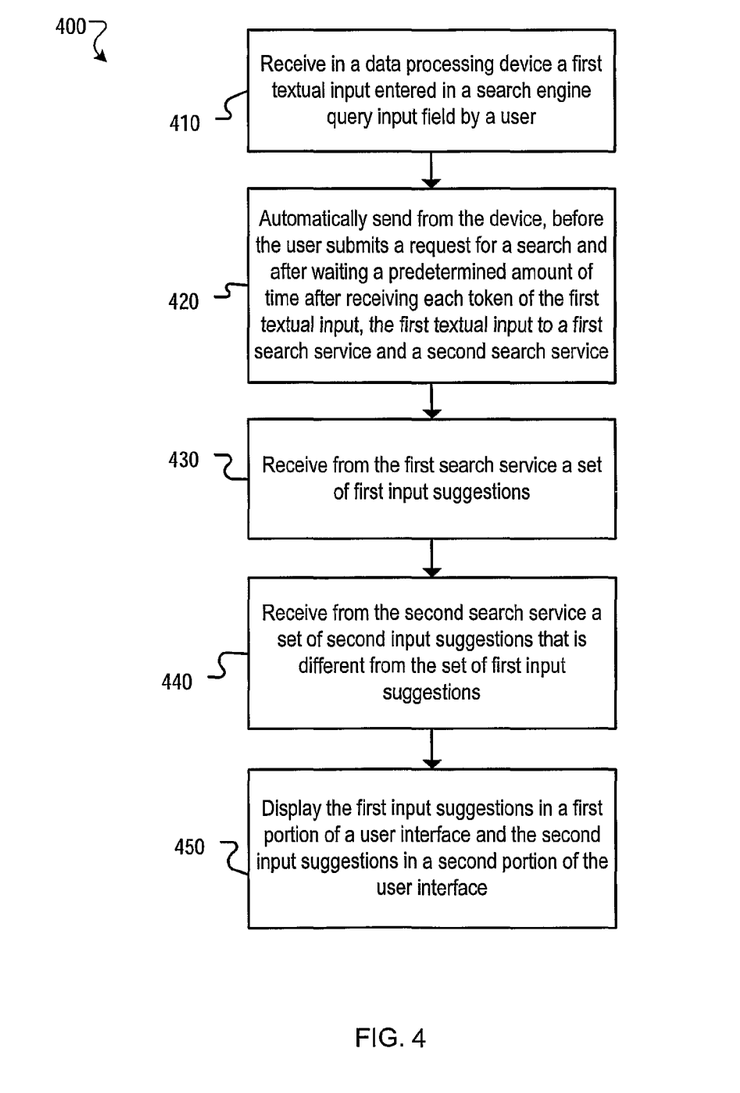
FIG. 4 is a flow chart showing an example process for automatically generating input suggestions using multiple search services.

FIG. 4 is a flow chart showing an example process 400 for automatically generating input suggestions using multiple search services. The process 400 includes receiving 410 in a data processing device a first textual input entered in a search engine query input field by a user. The process 400 also includes automatically sending 420 from the device, before the user submits a request for a search and after waiting a predetermined amount of time after receiving each token of the first textual input, the first textual input to a first search service and a second search service.

The process 400 also includes receiving 430 from the first search service a set of first input suggestions, and receiving 440 from the second search service a set of second input suggestions that is different from the set of first input suggestions. Each first input suggestion and second input suggestion is textually different from the first textual input and selectable as an alternative to the first textual input. The process 400 also includes displaying 450 the first input suggestions in a first portion of a user interface and the second input suggestions in a second portion of the user interface. The first portion is distinct from the second portion.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving in a data processing device a first textual input entered in a search engine query input field by a user;
   automatically sending from the device, before the user submits a request for a search and after waiting a predetermined amount of time after receiving each token of the first textual input, the first textual input to a first search service and a second search service;
   receiving from the first search service a set of first input suggestions, each first input suggestion being textually different from the first textual input and selectable as an alternative to the first textual input;
   receiving from the second search service a set of second input suggestions that is different from the set of first input suggestions, each second input suggestion being textually different from the first textual input and selectable as an alternative to the first textual input;
   displaying the first input suggestions in a first portion of a user interface and the second input suggestions in a second portion of the user interface, where the first portion is distinct from the second portion;
   receiving a user selection of a displayed input suggestion; and
   if the user selection is of a first input suggestion, sending the selection to the first search service and not the second search service, and if the user selection is of a second input suggestion, sending the selection to the second search service and not the first search service.

2. The method of claim 1, further comprising:
   storing the first input suggestions and the second input suggestions in a local cache memory;
   receiving a second textual input entered in a search engine query input field by the user after receiving the first textual input and after the first input suggestions and the second input suggestions are stored in the local cache memory;
   comparing the second textual input to the first textual input and determining that the first textual input is the same as the second textual input; and
   displaying the first input suggestions and the second input suggestions stored in the local cache memory.

3. The method of claim 1, where the first input suggestions are query expansions that represent alternative queries.

4. The method of claim 3, where the second input suggestions identify Internet addresses of suggested resources.

5. The method of claim 1, where the device is an intermediate server.

6. The method of claim 1, where the device is a client computer directly controlled by the user.

7. The method of claim 1, where displaying the first input suggestions and the second input suggestions includes displaying the first input suggestions in the first portion and the second input suggestions in the second portion of a same interface element in the user interface.

8. The method of claim 7, where the same interface element is a drop-down menu.

9. The method of claim 7, further comprising:
   rendering the first portion using a first color and the second portion using a distinct second color.

10. The method of claim 1, further comprising:
    receiving user preferences specifying the first search service and the second search service.

11. A system comprising:
    an intermediate server comprising a computer;
    where the server is operable to perform the actions of:
       receiving a first textual input entered in a search engine query input field by a user;
       automatically sending, before the user submits a request for a search and after waiting a predetermined amount of time after receiving each token of the first textual input, the first textual input to a first search service and a second search service;
       receiving from the first search service a set of first input suggestions, each first input suggestion being textually different from the first textual input and selectable as an alternative to the first textual input;
       receiving from the second search service a set of second input suggestions that is different from the set of first input suggestions, each second input suggestion being textually different from the first textual input and selectable as an alternative to the first textual input;

displaying the first input suggestions in a first portion of a user interface and the second input suggestions in a second portion of the user interface, where the first portion is distinct from the second portion;

receiving a user selection of a displayed input suggestion; and if the user selection is of a first input suggestion, sending the selection to the first search service and not the second search service, and if the user selection is of a second input suggestion, sending the selection to the second search service and not the first search service.

12. The system of claim 11, where the server is operable to perform the actions of:

storing the first input suggestions and the second input suggestions in a local cache memory;

receiving a second textual input entered in a search engine query input field by the user after receiving the first textual input and after the first input suggestions and the second input suggestions are stored in the local cache memory;

comparing the second textual input to the first textual input and determining that the first textual input is the same as the second textual input; and displaying the first input suggestions and the second input suggestions stored in the local cache memory.

13. The system of claim 11, where the first input suggestions are query expansions that represent alternative queries.

14. The system of claim 13, where the second input suggestions identify Internet addresses of suggested resources.

15. The system of claim 11, where displaying the first input suggestions and the second input suggestions includes displaying the first input suggestions in the first portion and the second input suggestions in the second portion of a same interface element in the user interface.

16. The system of claim 15, where the same interface element is a drop-down menu.

17. The system of claim 15, where the server is operable to perform the actions of:

rendering the first portion using a first color and the second portion using a distinct second color.

18. The system of claim 11, where the server is operable to perform the actions of:

receiving user preferences specifying the first search service and the second search service.

19. A computer program product, stored on a computer-readable medium, comprising instructions that when executed on an intermediate server cause the server to perform operations comprising:

receiving a first textual input entered in a search engine query input field by a user;

automatically sending, before the user submits a request for a search and after waiting a predetermined amount of time after receiving each token of the first textual input, the first textual input to a first search service and a second search service;

receiving from the first search service a set of first input suggestions, each first input suggestion being textually different from the first textual input and selectable as an alternative to the first textual input;

receiving from the second search service a set of second input suggestions that is different from the set of first input suggestions, each second input suggestion being textually different from the first textual input and selectable as an alternative to the first textual input;

displaying the first input suggestions in a first portion of a user interface and the second input suggestions in a second portion of the user interface, where the first portion is distinct from the second portion;

receiving a user selection of a displayed input suggestion; and if the user selection is of a first input suggestion, sending the selection to the first search service and not the second search service, and if the user selection is of a second input suggestion, sending the selection to the second search service and not the first search service.

20. A system comprising:

an intermediate server comprising a computer;

where the server includes:

an input detection submodule that receives a first textual input entered in a search engine query input field by a user;

a data processing submodule that automatically sends, before the user submits a request for a search and after waiting a predetermined amount of time after receiving each token of the first textual input, the first textual input to a first search service and a second search service; receives from the first search service a set of first input suggestions, each first input suggestion being textually different from the first textual input and selectable as an alternative to the first textual input; and receives from the second search service a set of second input suggestions that is different from the set of first input suggestions, each second input suggestion being textually different from the first textual input and selectable as an alternative to the first textual input; and a render submodule that renders the first input suggestions for display in a first portion of a user interface and the second input suggestions for display in a second portion of the user interface, where the first portion is distinct from the second portion, wherein the data processing submodule further receives a user selection of a displayed input suggestion, and, if the user selection is of a first input suggestion, sends the selection to the first search service and not the second search service, and, if the user selection is of a second input suggestion, sends the selection to the second search service and not the first search service.

* * * * *